(12) United States Patent
Talwar et al.

(10) Patent No.: US 10,304,454 B2
(45) Date of Patent: May 28, 2019

(54) PERSISTENT TRAINING AND PRONUNCIATION IMPROVEMENTS THROUGH RADIO BROADCAST

(71) Applicant: GM GLOBAL TECHNOLOGY OPERATIONS LLC, Detroit, MI (US)

(72) Inventors: Gaurav Talwar, Novi, MI (US); Kenneth R. Booker, Detroit, MI (US); Xu Fang Zhao, LaSalle (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/707,315

(22) Filed: Sep. 18, 2017

(65) Prior Publication Data

US 2019/0088255 A1    Mar. 21, 2019

(51) Int. Cl.
| | | |
|---|---|---|
| *G10L 15/00* | (2013.01) | |
| *G10L 15/22* | (2006.01) | |
| *G10L 15/26* | (2006.01) | |
| *B60R 16/037* | (2006.01) | |

(52) U.S. Cl.
CPC .......... *G10L 15/22* (2013.01); *B60R 16/0373* (2013.01); *G10L 15/26* (2013.01); *G10L 2015/223* (2013.01)

(58) Field of Classification Search
USPC .................. 704/231–257, 270–275
See application file for complete search history.

(56) References Cited

U.S. PATENT DOCUMENTS

| | | | |
|---|---|---|---|
| 8,639,508 B2 | 1/2014 | Zhao et al. | |
| 8,756,062 B2 | 6/2014 | Talwar et al. | |
| 9,202,465 B2 | 12/2015 | Talwar et al. | |
| 2004/0230420 A1* | 11/2004 | Kadambe | G10L 15/07 704/205 |
| 2005/0043067 A1* | 2/2005 | Odell | G10L 15/26 455/569.2 |
| 2006/0031069 A1* | 2/2006 | Huang | G10L 13/08 704/243 |
| 2006/0100873 A1* | 5/2006 | Bittner | G06F 17/5036 704/256.2 |
| 2009/0234651 A1* | 9/2009 | Basir | G10L 15/02 704/254 |
| 2012/0109649 A1 | 5/2012 | Talwar et al. | |
| 2012/0197643 A1 | 8/2012 | Talwar et al. | |
| 2015/0248881 A1 | 9/2015 | Holdren et al. | |
| 2016/0188706 A1* | 6/2016 | Momosaki | G10L 15/22 707/722 |

\* cited by examiner

*Primary Examiner* — Jesse S Pullias

(57) ABSTRACT

A processor receives a broadcast in a vehicle, select audio data from the broadcast, processes the audio data selected from the broadcast, determines a phonetic pattern of the selected audio data based on the processing, selects additional instances of audio data from the broadcast that resemble the selected audio data, processes the additional instances of audio data from the broadcast, determine phonetic patterns of the additional instances of audio data, and selects a plurality of phonetic patterns from the phonetic pattern of the selected audio data and the phonetic patterns of the additional instances of audio data. A transmitter transmits the plurality of phonetic patterns to a server to determine an optimal pronunciation of the selected audio data based on a statistical analysis of the plurality of phonetic patterns and to add the optimal pronunciation of the selected audio data to a database used to recognize speech in the vehicle.

20 Claims, 7 Drawing Sheets

PERSISTENT TRAINING AND PRONUNCIATION IMPROVEMENTS THROUGH RADIO BROADCAST

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to speech recognition systems and more particularly to persistent training and pronunciation improvements for speech recognition systems through radio broadcast.

Speech recognition systems (also called voice recognition systems) are used in vehicles, personal computing devices, and so on. For example, in vehicles, drivers can use these systems to give voice commands to make telephone calls, to give voice commands to navigation systems to search places of interest, and so on. In personal computing devices such as computers and smartphones, users can give audio commands to a browser to surf the Internet, for example. In other examples, some software programs can take dictation from a user (i.e., convert user's speech into text).

SUMMARY

A system comprises a processor configured to receive a broadcast in a vehicle, select audio data from the broadcast received in the vehicle, process the audio data selected from the broadcast, determine a phonetic pattern of the selected audio data based on the processing, select additional instances of audio data from the broadcast that resemble the selected audio data, process the additional instances of audio data from the broadcast, determine phonetic patterns of the additional instances of audio data, and select a plurality of phonetic patterns from the phonetic pattern of the selected audio data and the phonetic patterns of the additional instances of audio data. The system further comprises a transmitter configured to transmit the plurality of phonetic patterns to a server to determine an optimal pronunciation of the selected audio data based on a statistical analysis of the plurality of phonetic patterns and to add the optimal pronunciation of the selected audio data to a database used to recognize speech in the vehicle.

In other features, the broadcast in the vehicle includes a radio broadcast. The processor is configured to receive a speech input from an occupant of the vehicle. The transmitter is configured to transmit data corresponding to the speech input to the server. The transmitter is configured to transmit the data corresponding to the speech input to the server as audio or as a phonetic pattern via a cellular network. The system further comprises a receiver configured to receive a response to the speech input from the server upon the server processing the data corresponding to the speech input using the database. The response is based on correct recognition of the speech input using the database regardless of pronunciation associated with the speech input.

In other features, the processor is configured to select the plurality of phonetic patterns from the phonetic pattern of the selected audio data and the phonetic patterns of the additional instances of audio data that match within a predetermined range.

In other features, the statistical analysis includes Monte Carlo simulation, and the optimal pronunciation is determined based on whether a mean of distribution of results of the Monte Carlo simulation is greater than or equal to a predetermined threshold.

In other features, the database includes one or more of a phonetics dictionary and a language model for a type of data including the selected audio data.

In other features, the selected audio data includes a name of a person, a name of a place, a location of a person, a location of a place, a name of a music album, a title of a song, or a name of an artist.

In other features, the processor is configured to determine the phonetic pattern of the selected audio data and the phonetic patterns of the additional instances of audio data using grapheme-to-phoneme correspondences.

In other features, the system further comprises a receiver configured to receive a response to a speech request of an occupant of the vehicle from the server based on the database. The transmitter and the receiver are configured to communicate with the server via a cellular network.

In other features, the system further comprises a receiver configured to receive a response to a speech request of an occupant of the vehicle from the server based on the database. The speech request includes a name of a person, a name of a place, a location of a person, a location of a place, a name of a music album, a title of a song, or a name of an artist.

In other features, the processor is configured to receive a speech input from an occupant of the vehicle. And provide a response to the speech input based on correct recognition of the speech input using the database regardless of pronunciation associated with the speech input.

In other features, the system further comprises a memory configured to store the plurality of phonetic patterns when a network to communicate with the server is unavailable. The transmitter is configured to transmit the plurality of phonetic patterns stored in the memory to the server when the network becomes available.

In other features, the system further comprises a version of the database in the vehicle. When a network to communicate with the server is unavailable, the processor is configured to receive a speech input from an occupant of the vehicle, correctly recognize the speech input using the version of the database in the vehicle regardless of pronunciation associated with the speech input, and provide a response to the speech input based on the correctly recognized speech input. The speech input includes a voice command to call a person or a place of interest or a navigation command, and the response includes execution of the voice command or the navigation command.

In other features, the processor is configured to receive a speech input requesting information about a person or a location from an occupant of the vehicle, and provide a response to the speech input based on correct recognition of the speech input using the database regardless of pronunciation associated with the speech input.

In other features, the processor is configured to receive a voice command to call a person or a place of interest from an occupant of the vehicle, and execute the voice command based on correct recognition of the voice command using the database regardless of pronunciation associated with the voice command.

In other features, the processor is further configured to process speech input of an occupant of the vehicle and to control the vehicle based on the speech input of the occupant of the vehicle.

In other features, the processor is configured to receive an input including a voice command to control an operation of the vehicle, and control the operation of the vehicle based on correct recognition of the input using the database regardless of pronunciation associated with the input. The operation of the vehicle includes driving the vehicle to a location; controlling speed of the vehicle; or controlling an electrical, electronic, mechanical, or electromechanical system of the vehicle.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
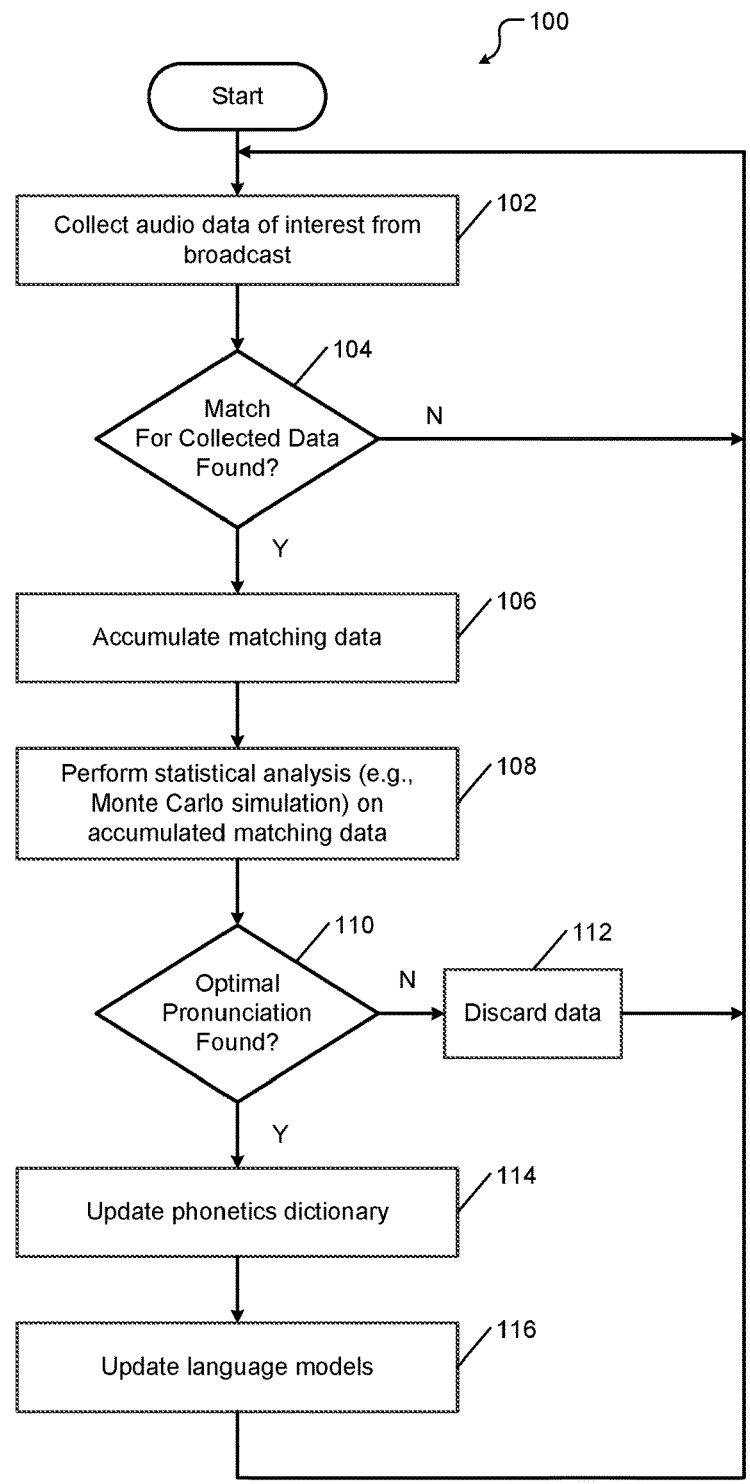
FIG. 1 is a flowchart of a method for providing persistent training and pronunciation improvements for speech recognition systems through radio broadcast in a vehicle.

The present disclosure relates to using live broadcast (e.g., radio broadcast in a vehicle) to improve phonetics dictionaries and language models for voice or speech recognition. Specifically, the speech recognition systems and methods according to the present disclosure learn new words and learn alternate pronunciations for existing words by listening to radio broadcast in vehicles. The disclosure is organized as follows. Initially, an overview of the disclosure is presented. Subsequently, various examples of the systems and methods according to the present disclosure are described with reference to FIGS. 1-9.

Speech recognition broadly comprises recognizing a static portion and a dynamic portion of speech. The static portion is generally an action that is applied to the dynamic portion. For example, in a voice command "Call [Name]", the action "Call" is the static portion, and [Name] is the dynamic portion. Other examples of voice commands or speech input include "Find [Location name, Street name, etc.]", "Take me to [Store name, Restaurant name, etc.]", and so on.

The pronunciation of the dynamic portion varies among people. For example, most peoples' names in western countries have generally definite and well-recognized pronunciations. Such is not the case with names of peoples in other parts of the world. Further, names of some people, places of interest or points of interest (POIs), streets, foods, and so on are not pronounced exactly as written. Accordingly, pronunciation of these names (e.g., the city of Charlevoix, Mich.), streets, restaurants, and so on, can vary among people.

In linguistics, pronunciations are represented as a sequence of phonetic expression. Transcriptions of phonetic expressions serve as textual tokens for speech recognition. The dynamic data (i.e., data representing the dynamic portions of speech) is not a deterministic set of names, POIs, etc. since the pronunciations for these data types can vary significantly among people. Therefore, it can be difficult for speech recognition systems to find a match for these dynamic data types in databases (e.g., navigational databases) that store some known, fixed pronunciations for these dynamic data types.

The present disclosure relates to systems and methods for learning correct and alternate pronunciations for dynamic data types of which pronunciations can vary among people and training speech recognition systems based on the learning. The systems and methods learn correct and alternate pronunciations for the dynamic data types by listening to radio broadcasts or any other sources providing speech output (e.g., podcasts, music, etc.). These broadcasts are rich sources of pronunciations of various types of dynamic data mentioned above. This is because these broadcasts often include advertisements, music, talk shows, news, and other programs that include speakers of diverse backgrounds talking about a variety of subject matter. As a result, in addition to learning new vocabulary (e.g., new POIs, restaurants, etc.), different pronunciations for known names, places, and so on can be captured from these broadcasts to supplement, enhance, and enrich the databases used by speech recognition systems. These updated databases can improve the accuracy and performance of the speech recognition systems by providing the systems the ability to recognize speech with varying pronunciations.

Speech recognition systems include a default or global phonetics dictionary that includes common linguistic components such as grapheme-to-phoneme (G-to-P) correspondences (GPCs) used for recognizing speech. A grapheme is a letter or a group of letters that represent a basic sound or phoneme. Examples include sh, ch, ough, etc. For example, in the term Monte Carlo simulation, the word Monte can be split into different syllables, and using GPC, a default phonetic sequence or phonetic pattern can be formed and stored for recognizing the word Monte.

However, the default GPC may be a brute phonetic transcription that may not be optimal. For example, the word Monte includes a pronunciation mark (of the shape of a comma or a single apostrophe) at the top end of the letter "e". Letters in some words include an umlaut (two dots) on top. The pronunciation mark may have been ignored in the default transcription of the word Monte while a person pronouncing the word Monte may not ignore the mark. Therefore, the person may pronounce the word differently than its default pronunciation stored in the dictionary. Alternately, the stored pronunciation in the dictionary may have considered the mark but the speaker may ignore the mark and therefore may pronounce the word differently than its default pronunciation stored in the dictionary. These types of differences between stored and spoken pronunciations of words can make the spoken words unrecognizable.

The systems and methods of the present disclosure supplement the dictionary with additional pronunciations for words by listening to radio broadcasts. The systems and methods employ persistent background speech recognition of live radio broadcast including music, classifieds or advertisements, news, talk shows, etc. A radio broadcast is persistently matched via a dictation-based recognition thread, which is persistently running as a background service, where a dictation thread can be defined as a speech recognition engine with very large vocabulary and/or grammar. A moving or dynamic recording buffer is used. Whenever positive speech recognition (i.e., a match) for a word or a phrase occurs, the corresponding audio is archived, and a phonetic definition of the relevant portion of the archived audio is extracted. By using Monte Carlo method, a distribution pattern of the extracted pronunciations is learned, and when the confidence in a particular pronunciation is sufficiently high (e.g., greater than or equal to a predetermined threshold), the phonetics dictionaries as well as the language models are updated with the new textual tokens representing the new pronunciations. This approach can improve speech recognition performance by providing refined phonetics for a subset of dynamic grammar tokens for functional domains of phone contacts, media artists/albums/song titles, as well as navigation attributes such as POIs and addresses, etc. Enriching and updating the language model as stated can improve the intent classification as well as provide better recognition of dynamic data types such as brand names, individuals' names, artist names, etc.

Accordingly, the systems and methods comprise running a background speech recognition thread and persistently listening to radio broadcast for dynamic data type matches. If a match occurs and is greater than or equal to a predetermined confidence threshold or likelihood probability, the results are accumulated and sampled. Through Monte Carlo simulation, if a repeated match between the broadcast phonetics and grammar orthographic token is obtained, the phonetics dictionary is appended appropriately. (For speech recognition, a token is an orthographic entity of the language being recognized. A token may be any string that a speech recognition system can convert to a phonetic representation.) In several cases, an orthographic reference is available a-priori or obtained just-in-time, for example, through Radio Data System (RDS) feed. RDS is a communications protocol standard for embedding small amounts of digital information in radio broadcasts. RDS standardizes several types of information transmitted, including time, station identification, and program information. The systems and methods help in augmenting the training of statistical language models for more frequently used keywords in speech recognition. The POI brands can also be enhanced in terms of additional exceptional pronunciation by listening to classifieds broadcast, which can improve local POI performance significantly.

Specifically, audio excerpts (audio clips or chunks) from a radio broadcast are captured. For example, a title of a song and a name of an artist in the excerpt are highlighted or demarcated. In a long utterance, timestamps can be used to set boundaries on portions or segments of the audio excerpt (such as dynamic data portions) of interest so that only relevant and optimal amounts of audio data can be archived. The captured and demarcated audio portions of these data are converted to text (phonetic transcriptions).

When a match is subsequently found (e.g., when the same title and name are broadcast, captured, and converted again and a comparison to the previous occurrence yields a high likelihood score indicating a match), the phonetic pattern for the pronunciations of these words is stored in a circular buffer. When used, the timestamps can be used to align a text representation of a segment to the audio version of the segment. If repeated matches are found, Monte Carlo simulation is performed, and the databases used for speech recognition are updated to indicate a new or alternate pronunciation for the word or words as explained below in detail. Specifically, the phonetics dictionary and the language models used for speech recognition are updated.

Some of the above processing may be performed in the vehicle or in the cloud. For example, the background speech recognition and dynamic data buffering may be performed in the vehicle while the Monte Carlo simulation may be performed in the cloud. For example, the speech recognition and data buffering may be performed in the vehicle when network service to communicate with the cloud is unavailable but broadcast service is available. The accumulated matches in the circular buffer in the vehicle can be packetized and sent to the cloud for Monte Carlo simulation when the network service becomes available. In some implementations, the audio excerpts may be packetized and sent to the cloud for speech recognition as well as Monte Carlo simulation.

These systems and methods operate in the background without any user interaction or input or awareness. That is, the updating of the phonetics dictionary and the language models occurs on an ongoing basis in the background without any user interaction or input or awareness. Further, in addition to learning new words and new pronunciations, the systems and methods provide an additional benefit: updating the pronunciation of one word may automatically improve speech recognition/intent classification of overall utterance/sentence by putting words in correct context For example, learning alternate pronunciations of the word Charlevoix may help in improving the intent classification/task completion for otherwise potentially ambiguous intents (e.g., resolving the intent for "Take me to Charlevoix" versus "Take me to Chevrolet"). The systems and methods improve pronunciation recognition of various dynamic data types such as POIs, names of artists, titles of music albums and songs, peoples' names, and so on.

Various examples of methods for training the speech recognition system are shown in FIGS. 1-5 and are described below. Examples of a system comprising vehicles communicating with a speech recognition system, a speech processing system in a vehicle, and a speech recognition system are shown in FIGS. 6-9 and are described below.

In the following description, the term control refers to one or more applications 416 and 466 described below with reference to FIGS. 6-9. In other words, the term control represents code or instructions executed by one or more components of the system 350 shown in FIGS. 6-9 to perform the described functionality.

FIG. 1 shows an overview of a method 100 for providing persistent training and pronunciation improvements for speech recognition systems through radio broadcast in a vehicle. At 102, control collects audio data of interest from radio broadcast in the vehicle. For example, the audio data of interest may include excerpts from radio broadcast including dynamic data types such as names of people and places as described above.

Figure 2:
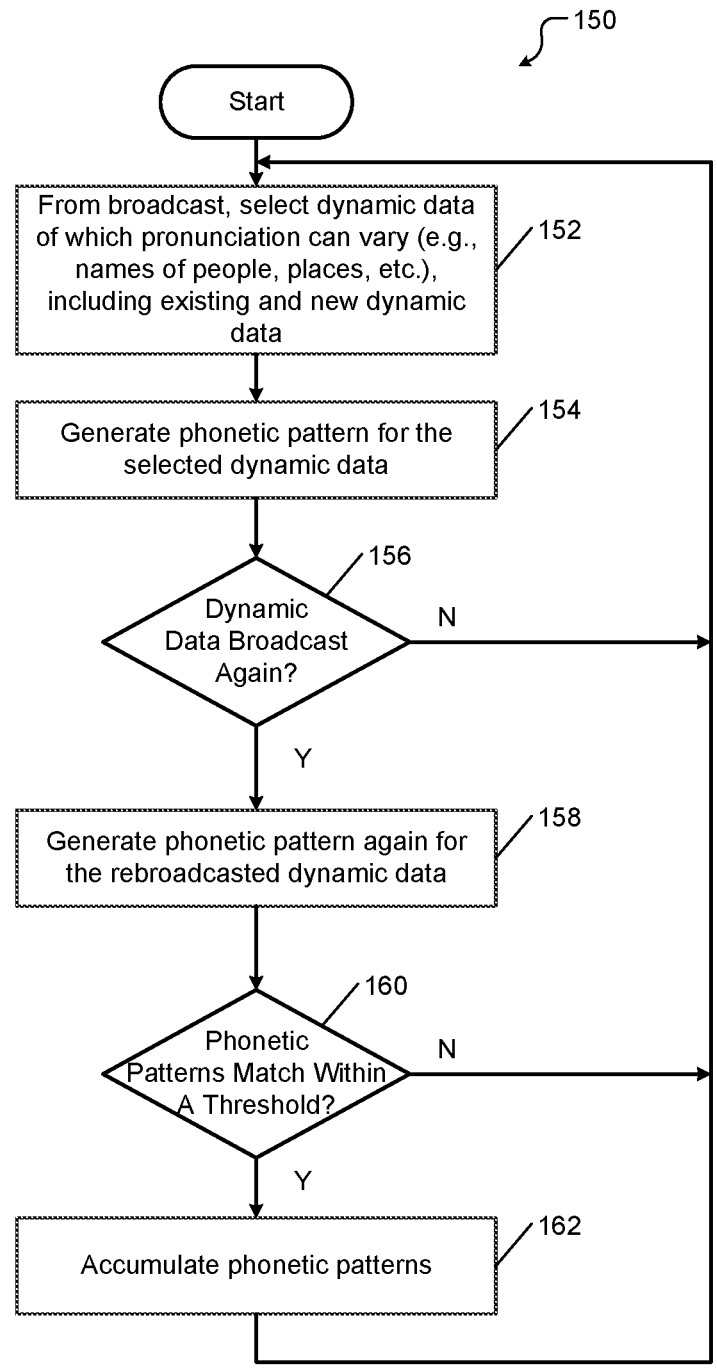
FIG. 2 is a flowchart of a method for finding a match for data collected from the broadcast in the vehicle and buffering the matching data for statistical analysis.

At 104, control determines whether a match for collected data is found in subsequent broadcast. Control returns to 102 if a match for collected data is not found (details are shown in FIG. 2). At 106, if a match is found, control accumulates matching data found in the broadcast.

Figure 3:
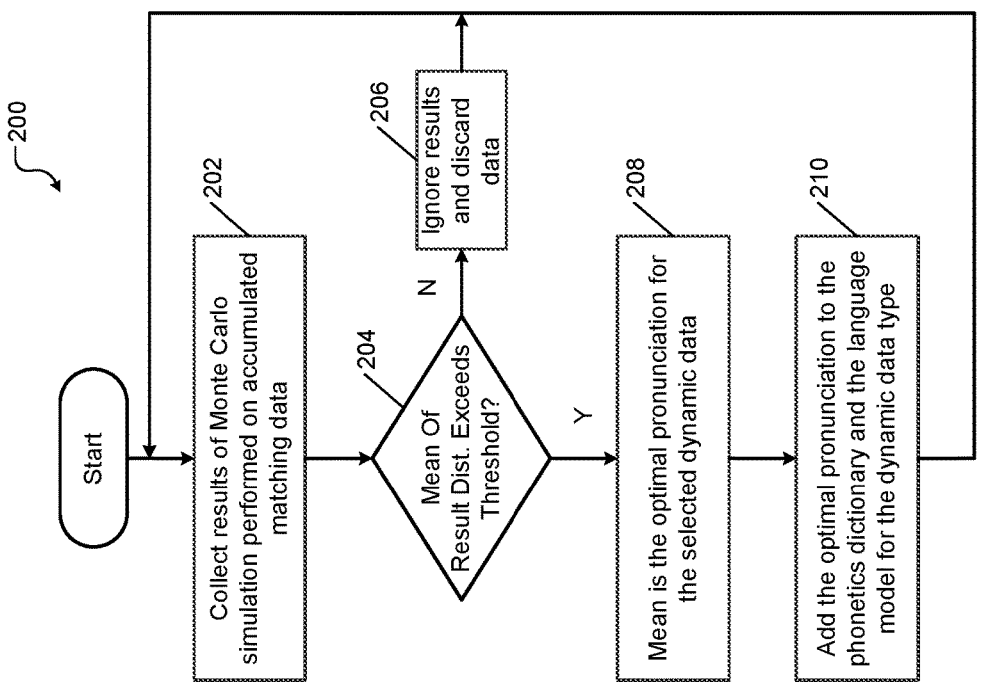
FIG. 3 is a flowchart of a method for finding an optimal pronunciation for the data collected from the broadcast by performing statistical analysis (e.g., Monte Carlo simulation) on the matching data accumulated in the buffer.

At 108, control performs statistical analysis (e.g., Monte Carlo simulation) on the accumulated matching data. At 110, control determines based on the statistical analysis whether an optimal pronunciation for the collected dynamic data is found (details are shown in FIG. 3). At 112, control discards the collected data if an optimal pronunciation is not found, and control returns to 102.

At 114, if an optimal pronunciation is found, control updates a phonetics dictionary by adding the optimal pronunciation to the phonetics dictionary. At 116, control updates a language model that handles the type of dynamic data for which the optimal pronunciation is found, and control returns to 102.

FIG. 2 shows a method 150 for finding a match for collected dynamic data (shown at 104 in FIG. 1). At 152, control selects, from the broadcast, dynamic data for which pronunciation can vary among people (e.g., names of people, places, etc.) and new dynamic data that may be added (e.g., song titles, contact names, etc.). The pronunciation updates can be applicable not only to existing dynamic data types, but can also be added for new dynamic data such as, for example, a song title or a contact name. The reference orthographic input can be available through the RDS feed. At 154, control generates a phonetic pattern for the selected dynamic data collected from the broadcast. That is, control converts the collected audio data into text using grapheme-to-phoneme (G-to-P) correspondences (GPCs) as explained above.

At 156, control determines whether the same dynamic data is broadcast again. Control returns to 152 if the same dynamic data is not broadcast again. At 158, if the same dynamic data is broadcast again, control again generates a phonetic pattern for the re-broadcasted data.

At 160, control determines whether the repeatedly (i.e., subsequently and previously) generated phonetic patterns for the same dynamic data match (i.e., are similar) within a predetermined threshold, indicating a particular degree of confidence in the matches found. In other words, control accumulates enough sample data to instill confidence in the decision of updating and/or appending pronunciation. Control returns to 152 if the subsequently and previously generated phonetic patterns for the same dynamic data do not match. At 162, if the subsequently and previously generated phonetic patterns for the same dynamic data match, control accumulates the phonetic patterns in a circular buffer for subsequent statistical processing (shown in FIG. 3), and control returns to 152.

FIG. 3 shows a method 200 for finding an optimal pronunciation for the dynamic data by performing statistical analysis (e.g., Monte Carlo simulation) on accumulated phonetic patterns for the dynamic data (shown at 108 and 110 in FIG. 1). At 202, control performs Monte Carlo simulation on accumulated matching phonetic patterns for a selected dynamic data collected from the broadcast and collects results of the Monte Carlo simulation. The results of Monte Carlo simulation may have a Gaussian distribution.

At 204, control determines whether a peak of the distribution of the results, indicating a mean of the distribution, is greater than or equal to a predetermined threshold. At 206, control ignores the results in discards the accumulated data if the mean of the distribution is not greater than or equal to the predetermined threshold, and control returns to 202.

At 208, if the mean of the distribution is greater than or equal to the predetermined threshold, the mean is the optimal pronunciation for the selected dynamic data collected from the broadcast. At 210, control updates the phonetics dictionary and the language model for the dynamic data type by adding the optimal pronunciation to the phonetics dictionary and the language model.

Figure 4:
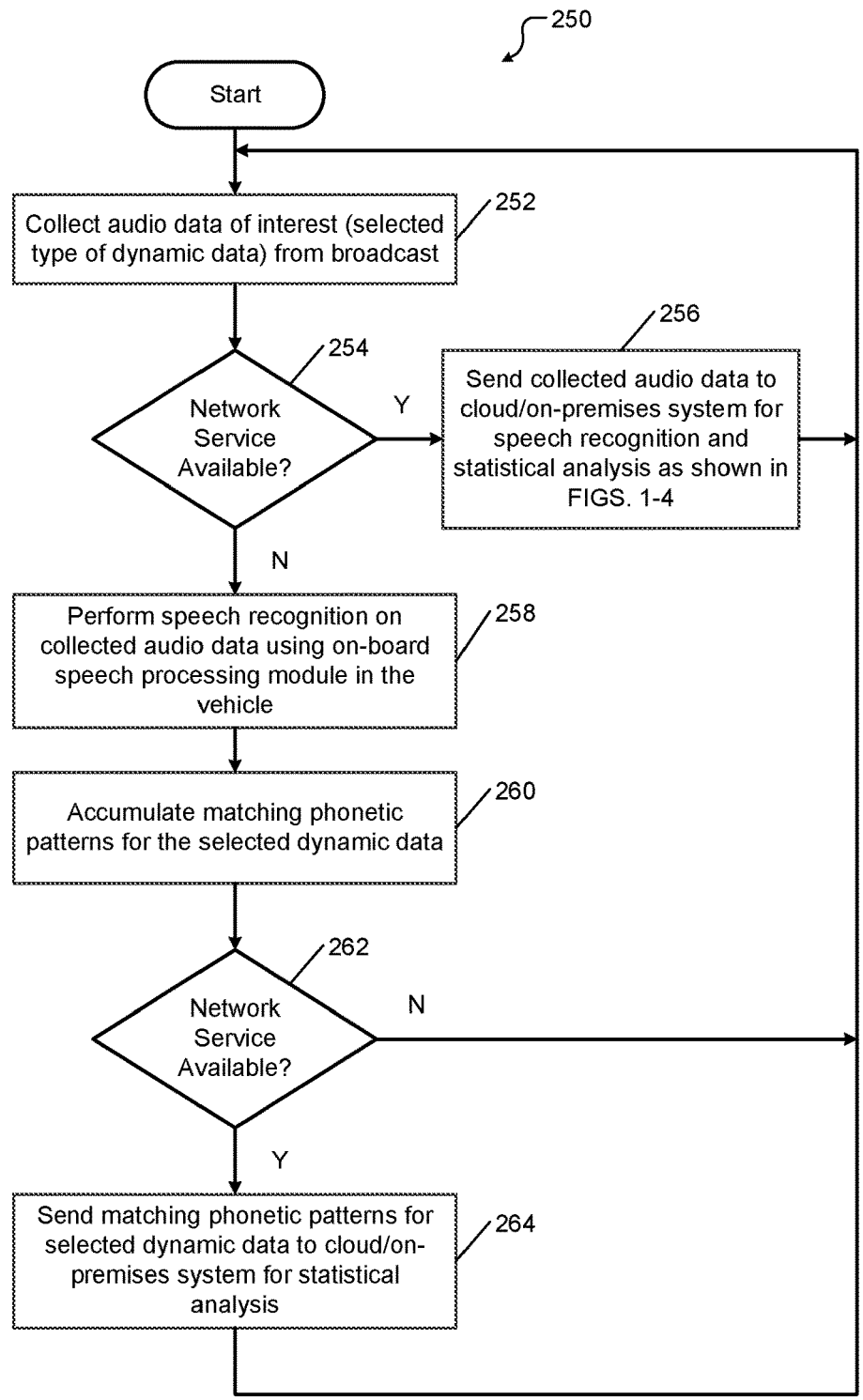
FIG. 4 is a flowchart of a method for performing speech recognition shown in FIGS. 1-3 partly in the vehicle and/or in the cloud, and for performing the statistical analysis in the cloud.

FIG. 4 shows a method 250 for performing speech recognition of dynamic data collected from the broadcast partly in the vehicle and/or in the cloud and for performing statistical analysis in the cloud. At 252, control collects audio data of interest (i.e., selected type of dynamic data) from the broadcast in the vehicle.

At 254, control determines if network service (e.g., cellular service) is available where the vehicle is located. At 256, if the network service is available, control packetizes and sends the collected audio data via the network service to an on-premises or cloud-based speech recognition system (e.g., a speech recognition system 370 shown in FIGS. 6-9), and control returns to 252.

At 258, if the network service is unavailable, control performs speech recognition on the collected audio data (as shown in FIGS. 1-2) using an onboard speech processing module (e.g., a speech processing module 390 shown in FIGS. 7-8) in the vehicle. At 260, control accumulates matching phonetic patterns for the selected dynamic data based on repeatedly collected audio data of interest from the broadcast (as shown in FIGS. 1-2).

At 262, control determines whether the network service is available. Control returns to 252 if the network service is unavailable. At 264, if network service is available, control packetizes and sends the accumulated matching phonetic patterns for the selected dynamic data via the network service to the on-premises or cloud-based speech recognition system (e.g., a speech recognition system 370 shown in FIGS. 6-9) for statistical analysis (e.g., Monte Carlo simulation shown in FIG. 3), and control returns to 252.

Figure 5:
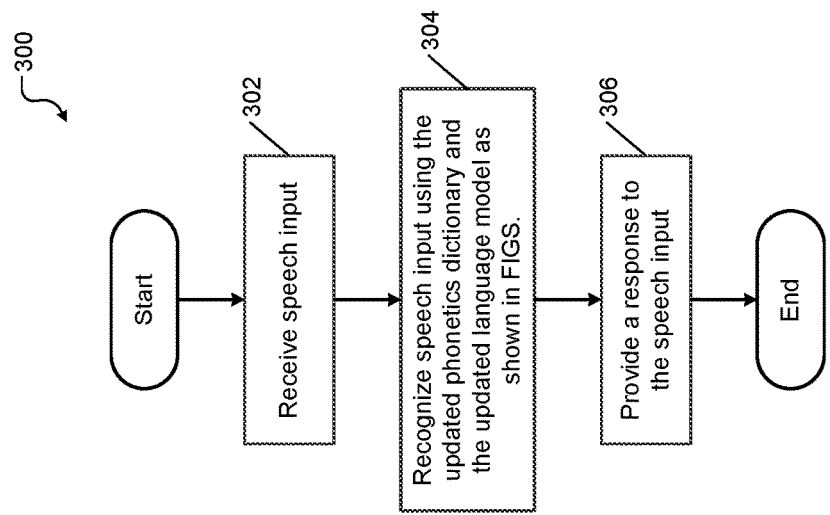
FIG. 5 is a flowchart of a method for recognizing speech of an occupant of the vehicle using a speech recognition system shown in FIGS. 6-9 that is trained as shown in FIGS. 1-4.

FIG. 5 shows a method 300 for recognizing speech of an occupant of the vehicle using a speech recognition system (e.g., a speech recognition system 370 shown in FIGS. 6-9) that is trained using radio broadcast in the vehicle as shown in FIGS. 1-4. At 302, control receives speech input (e.g., a voice command) from an occupant of the vehicle. At 304, control correctly recognizes the speech input using the updated phonetics dictionary and the updated language model as shown in FIGS. 1-4.

At 306, control provides a response to the correctly recognized speech input using the trained speech recognition system (e.g., a speech recognition system 370 shown in FIGS. 6-9). For example, the response may include executing a command such as calling a correctly recognized person, finding a correctly recognized place, displaying a map for a correctly recognized address, and so on. The speech recognition can be partly or fully performed in the vehicle similar to FIG. 4.

Figure 6:
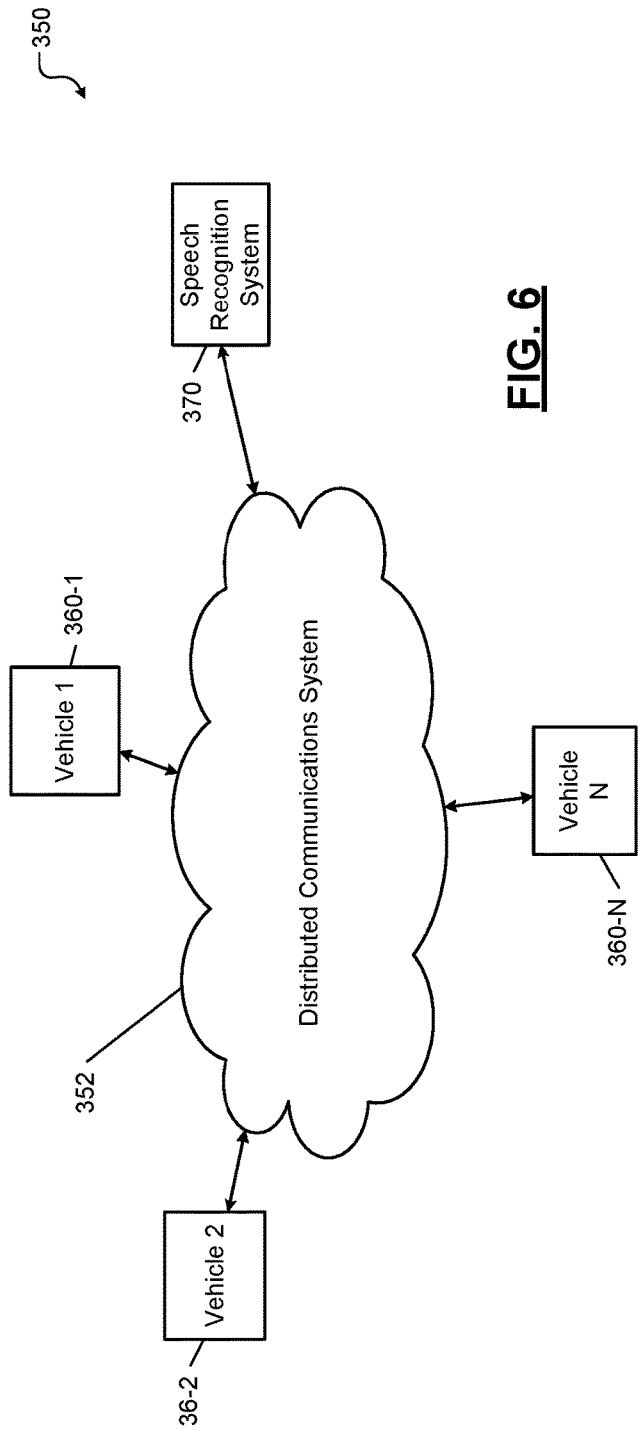
FIG. 6 is a schematic of a system comprising a plurality of vehicles communicating with a speech recognition system via a distributed communication system.

FIG. 6 shows a system 350 comprising a plurality of vehicles communicating with a speech recognition system via a distributed communication system. The system 350 comprises vehicle 1 360-1, vehicle 2 360-2, . . . , and vehicle N 360-N (collectively vehicles 360), where N is an integer greater than or equal to 1. The system 350 further comprises a speech recognition system 370 and a distributed communication system 352.

The vehicles 360 communicate with the speech recognition system 370 via the distributed communication system 352. For example, the distributed communication system 352 may include one or more of a cellular communication system, a local area network (LAN) and/or a wide area network (WAN), a Wi-Fi network, and the Internet.

Data collected from radio broadcasts in the vehicles 360 as described above in FIGS. 1-5 is sent to the speech recognition system 370 via the distributed communication system 352. The speech recognition system 370 sends responses to speech inputs received from occupants of the vehicles 360 via the distributed communication system 352.

Figure 7:
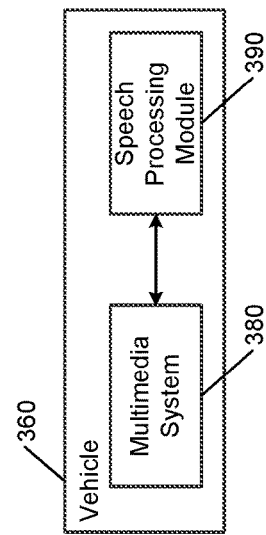
FIG. 7 is a schematic of a vehicle comprising a multimedia system including one or more sources for broadcasting audio and a speech processing module implementing one or more methods shown in FIGS. 1-5.
Figure 8:
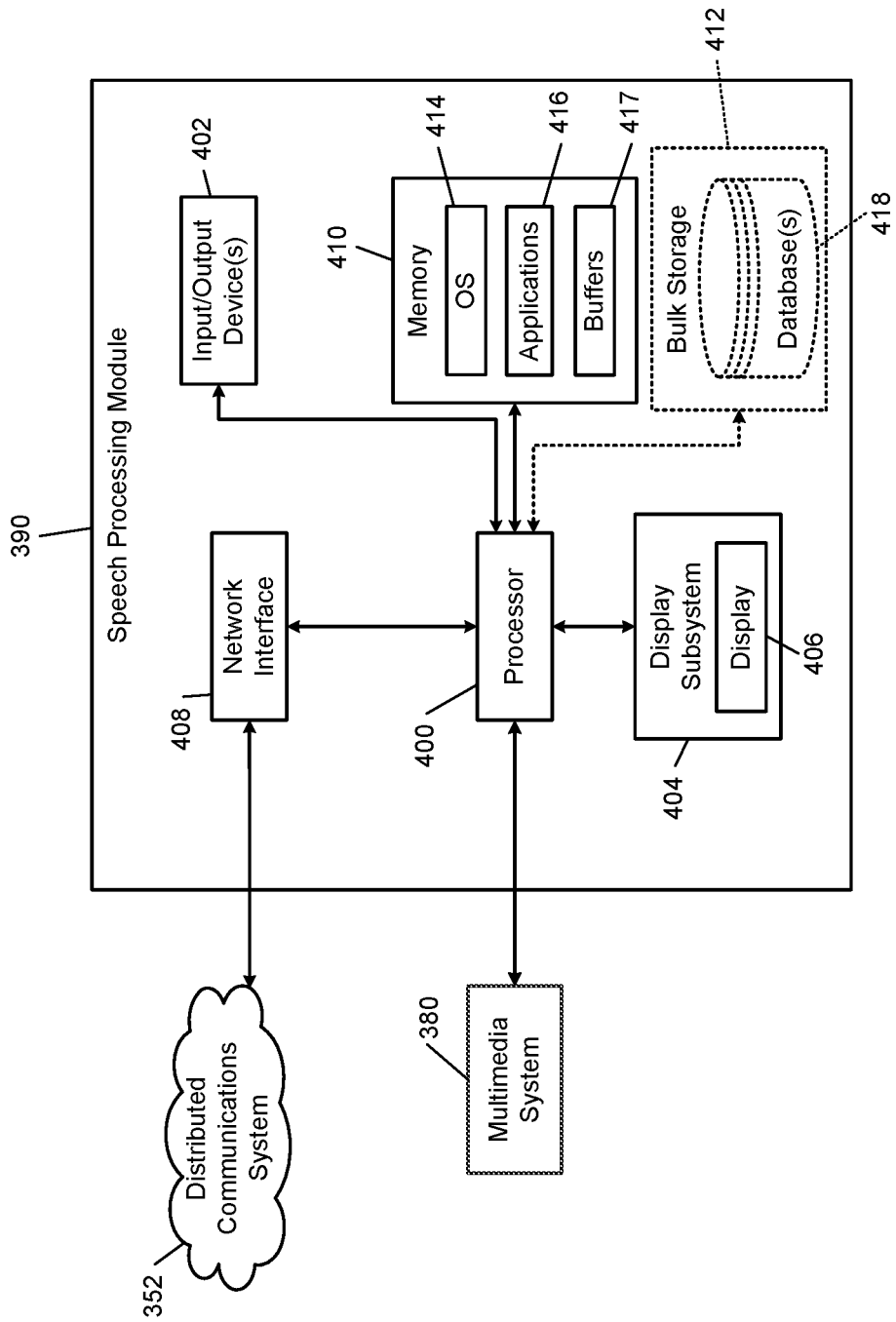
FIG. 8 is a simplified functional block diagram of the speech processing module shown in FIG. 7.

FIG. 7 shows a functional block diagram of a system in a vehicle 360 comprising a multimedia system 380 and a speech processing module 390 (shown in detail in FIG. 8). For example, the multimedia system 380 in the vehicle 360 may include various sources for providing audio broadcasts such as radio broadcasts, podcasts, etc. Numerous other sources for providing streaming speech output are contemplated and are within the scope of the disclosure. Non-limiting examples of the sources include satellite radio, television, CD players, MP3 players, smartphones, audio books, and so on.

The speech processing module 390 processes audio data collected from the broadcasts as shown in FIGS. 1-4. The speech processing module 390 processes speech input received from an occupant of a vehicle 360 as shown in FIG. 5.

FIG. 8 shows a simplified example of the speech processing module 390. The speech processing module 390 may typically include a central processing unit (CPU) or processor 400, one or more input/output devices 402 (e.g., a touchpad, a microphone, a speaker, and so on), a display subsystem 404 including a display 406, a network interface 408, a memory 410, and an optional bulk storage 412.

The network interface 408 connects the speech processing module 390 to the distributed communication system 352. For example, the network interface 408 may include a wireless interface (e.g., a cellular, Wi-Fi, Bluetooth, near field communication (NFC), or other wireless interface). Accordingly, the network interface 408 may include suitable transmitter(s) and receiver(s).

The memory 410 may include volatile or nonvolatile memory, cache, or other type of memory. For example, the memory 410 may include one or more buffers (e.g., circular buffers) 417 to store the phonetic patterns as described above.

The optional bulk storage 412 may include flash memory, a hard disk drive (HDD), or other bulk storage device. When used, the bulk storage 412 may include the buffers 417 instead of or in addition to the buffers 417 in the memory 410. Further, when used, the bulk storage 412 may optionally include one or more databases 418. The databases 418 may be periodically updated by the speech processing system 370 to provide speech recognition (e.g., limited to navigation) when the vehicle 360 is out of range of the distributed communication system 352 (i.e., when network service is unavailable (e.g., see FIG. 4)).

The processor 400 executes an operating system (OS) 414 and one or more applications 416. The applications 416 include an application to connect the speech processing module 390 to the speech processing system 370 via the distributed communication system 352. The speech processing module 390 accesses one or more applications executed by the speech processing system 370 via the distributed communication system 352. The speech processing module 390 communicates with the multimedia system 380 in the vehicle 360. The applications 416 include an application that implements one or more methods (including portions of the methods) shown in FIGS. 1-5.

Figure 9:
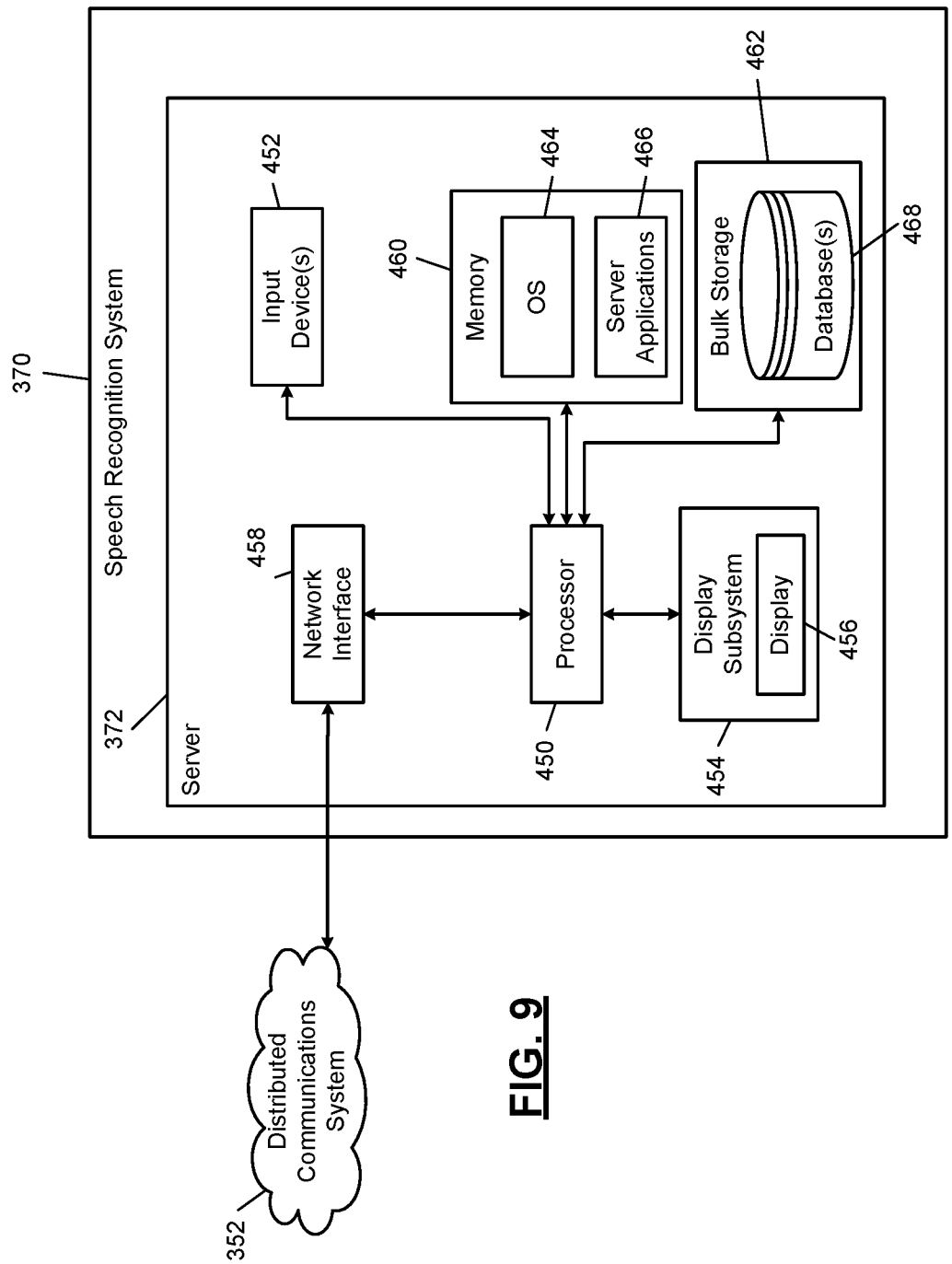
FIG. 9 is a simplified functional block diagram of the speech recognition system shown in FIG. 6.

FIG. 9 shows a simplified example of the speech processing system 370. The speech processing system 370 typically includes one or more servers 372 although only one server 372 is shown for simplicity of illustration. The servers 372 may be networked together using any suitable network (e.g., LAN, WAN, Wi-Fi 33 networks, and/or the Internet). The servers 372 may be located on-premises, in the cloud, or both. Each server 372 typically includes one or more CPUs or processors 450, one or more input devices 452 (e.g., a keypad, touchpad, mouse, and so on), a display subsystem 454 including a display 456, a network interface 458, a memory 460, and a bulk storage 462.

The network interface 458 connects the server 372 to the distributed communication system 352. For example, the network interface 458 may include a wired interface (e.g., an Ethernet interface) and/or a wireless interface (e.g., a Wi-Fi, Bluetooth, near field communication (NFC), or other wireless interface). Accordingly, the network interface 458 may include suitable transmitter(s) and receiver(s).

The memory 460 may include volatile or nonvolatile memory, cache, or other type of memory. The bulk storage 462 may include flash memory, one or more hard disk drives (HDDs), or other bulk storage device.

The processor 450 executes an operating system (OS) 414 and one or more applications 466. The applications 466 include an application to connect the server 372 to the distributed communication system 352. The applications 466 may include an application that implements one or more methods (including portions of the methods) shown in FIGS. 1-5 for providing speech recognition services to the vehicles 360 as described above. The bulk storage 462 may store one or more databases 468 (e.g., the phonetics dictionary, the language models, etc.) that store data structures used by the applications 416 to perform respective functions and functionality described above.

In use, the speech processing module 390 processes audio data from broadcast received from the multimedia system 380 as described in FIGS. 1-4 above. The speech processing system 370 updates the phonetics dictionary and the language models for various types of audio data (e.g., the databases 468 of the speech processing system 370 shown in FIG. 9) as described in FIGS. 1-4 above.

Further, the speech processing module 390 processes a speech input from an occupant of the vehicle 360 by communicating with the speech processing system 370. The speech processing system 370 returns a response to the speech input (e.g., contact information for a person or location of a place requested in the speech input) by recognizing the speech input with enhanced accuracy due to the updated databases 468. The speech processing module 390 may display the response on the display 406 or may output the response through the speaker in the input/output devices 402. The response may also include making a call to a person correctly recognized in the speech input, and so on.

While a vehicle is used as an example throughout the disclosure, the teachings of the present application are also applicable to non-vehicle implementations. Further, while radio broadcast is used as an example throughout the disclosure, other sources providing speech output are contemplated and are within the scope of the disclosure. Furthermore, the speech recognition systems and methods described in the present disclosure can also be used to control autonomous vehicles (e.g., one or more vehicles 360 can include autonomous vehicles).

Throughout the present disclosure, for example only, the audio data of interest and the content of a speech input/request or voice command are described as including a name of a person, a name of a place, a location of a person, a location of a place, a name of a music album, a title of a song, or a name of an artist. However, the audio data of interest and the content of a speech input/request or voice command are not so limited. Rather, the audio data of interest and the content of a speech input/request or voice command are may include other applicable data types that currently exist or could emanate in the future. Additional examples of the audio data of interest and the content of a speech input/request or voice command may include Podcast Titles, Genres, Events, and Classified Services—e.g., Begonia Landscaping, and so on.

Further, throughout the present disclosure, for example only, the speech input is described as including a voice command to call a person or a place of interest or a navigation command. However, the speech input is not so limited. Rather, the speech input may also include other speech-supported use cases such as Media browsing, Radio Tuning, Messaging, etc.

Furthermore, throughout the present disclosure, for example only, a cellular network is used for communication between a vehicle and a system external to the vehicle. However, other types of communication may be used to transmit and receive data between a vehicle and a system external to the vehicle such as, e.g., cell phone Bluetooth connection, a Wi-Fi network, near-field communication (NFC), and so on.

In one aspect, a method comprises receiving a broadcast in a vehicle, selecting audio data from the broadcast, and determining a phonetic pattern of the selected audio data. The method further comprises selecting additional instances of audio data in the broadcast that resemble the selected audio data, and determining phonetic patterns of the additional instances of audio data. The method further comprises performing a statistical analysis of the phonetic patterns, and determining an optimal pronunciation of the selected audio data based on the statistical analysis. The method further comprises updating a database used to recognize speech in the vehicle by adding the optimal pronunciation to the database.

In other aspects, the method further comprises receiving a speech input from an occupant of the vehicle, and recognizing the speech input using the updated database. The broadcast in the vehicle includes a radio broadcast. The selected audio data includes a name of a person, a name of a place, a location of a person, a location of a place, a name of a music album, a title of a song, or a name of an artist. The method further comprises determining the phonetic pattern of the selected audio data and the phonetic patterns of the additional instances of audio data using grapheme-to-phoneme correspondences. The statistical analysis includes Monte Carlo simulation, and determining the optimal pronunciation includes determining whether a mean of distribution of results of the Monte Carlo simulation is greater than or equal to a predetermined threshold. The database includes one or more of a phonetics dictionary and a language model for a type of data including the selected audio data.

In another aspect, a system comprises a processor configured to process audio data selected from a broadcast received in a vehicle, determine a phonetic pattern of the selected audio data based on the processing, process additional instances of audio data in the broadcast that resemble the selected audio data, and determine phonetic patterns of the additional instances of audio data. The system further comprises a transmitter configured to transmit the phonetic patterns to a server for determining an optimal pronunciation of the selected audio data based on a statistical analysis of the phonetic patterns and for adding the optimal pronunciation to a database used to recognize speech in the vehicle.

In other aspects, the processor is configured to receive a speech input from an occupant of the vehicle, and receive a response to the speech input from the server based on the database. The broadcast in the vehicle includes a radio broadcast. The selected audio data includes a name of a person, a name of a place, a location of a person, a location of a place, a name of a music album, a title of a song, or a name of an artist. The processor is configured to determine the phonetic pattern of the selected audio data and the phonetic patterns of the additional instances of audio data using grapheme-to-phoneme correspondences. The system further comprises a receiver configured to receive a response to a speech request of an occupant of the vehicle from the server based on the database. The transmitter and the receiver are configured to communicate with the server via a cellular network. The system further comprises a memory configured to store the phonetic pattern of the selected audio data and the phonetic patterns of the additional instances of audio data when a network to communicate with the server is unavailable. The transmitter is configured to transmit contents of the memory to the server when the network becomes available.

In yet another aspect, a system comprises a receiver configured to receive, from a vehicle, phonetic patterns of a plurality of instances of selected audio data from a broadcast in the vehicle. The system further comprises a processor configured to determine an optimal pronunciation of the selected audio data based on a statistical analysis of the phonetic patterns, and add the optimal pronunciation to a database used for speech recognition in the vehicle.

In other aspects, the processor is configured to receive a phonetic pattern associated with a speech input from an occupant of the vehicle, and recognize the phonetic pattern associated with the speech input using the database. The system further comprises a transmitter configured to transmit a response to a speech request of an occupant of the vehicle using the updated database. The broadcast in the vehicle includes a radio broadcast, and the selected audio data includes a name of a person, a name of a place, a location of a person, a location of a place, a name of a music album, a title of a song, or a name of an artist. The statistical analysis includes Monte Carlo simulation, and the processor is configured to determine the optimal pronunciation by determining whether a mean of distribution of results of the Monte Carlo simulation is greater than or equal to a predetermined threshold. The database includes one or more of a phonetics dictionary and a language model for a type of data including the selected audio data.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
a processor configured to
receive a broadcast in a vehicle;
select audio data from the broadcast received in the vehicle;
process the audio data selected from the broadcast;
determine a phonetic pattern of the selected audio data based on the processing;
select additional instances of audio data from the broadcast that resemble the selected audio data;
process the additional instances of audio data from the broadcast;
determine phonetic patterns of the additional instances of audio data; and
select a plurality of textual phonetic patterns from the phonetic pattern of the selected audio data and the phonetic patterns of the additional instances of audio data; and
a transmitter configured to transmit the plurality of textual phonetic patterns from the vehicle to a server to determine an optimal pronunciation of the selected audio data based on a statistical analysis of the plurality of textual phonetic patterns and to add the optimal pronunciation of the selected audio data to a database used to recognize speech in the vehicle.

2. The system of claim 1, wherein the broadcast in the vehicle includes a radio broadcast.

3. The system of claim 1, wherein:
the processor is configured to receive a speech input from an occupant of the vehicle; and
the transmitter is configured to transmit data corresponding to the speech input to the server,
the system further comprising:
a receiver configured to receive a response to the speech input from the server upon the server processing the data corresponding to the speech input using the database,
wherein the response is based on correct recognition of the speech input using the database regardless of pronunciation associated with the speech input.

4. The system of claim 3, wherein the transmitter is configured to transmit the data corresponding to the speech input to the server as audio or as a phonetic pattern via a cellular network.

5. The system of claim 1, wherein the processor is configured to select the plurality of textual phonetic patterns from the phonetic pattern of the selected audio data and the phonetic patterns of the additional instances of audio data that match within a predetermined range.

6. The system of claim 1, wherein the statistical analysis includes Monte Carlo simulation, and wherein the optimal pronunciation is determined based on whether a mean of distribution of results of the Monte Carlo simulation is greater than or equal to a predetermined threshold.

7. The system of claim 1, wherein the database includes one or more of a phonetics dictionary and a language model for a type of data including the selected audio data.

8. The system of claim 1, wherein the selected audio data includes a name of a person, a name of a place, a location of a person, a location of a place, a name of a music album, a title of a song, or a name of an artist.

9. The system of claim 1, wherein the processor is configured to determine the phonetic pattern of the selected audio data and the phonetic patterns of the additional instances of audio data using grapheme-to-phoneme correspondences.

10. The system of claim 1, further comprising a receiver configured to receive a response to a speech request of an occupant of the vehicle from the server based on the database, wherein the transmitter and the receiver are configured to communicate with the server via a cellular network.

11. The system of claim 1, further comprising a receiver configured to receive a response to a speech request of an occupant of the vehicle from the server based on the database, wherein the speech request includes a name of a person, a name of a place, a location of a person, a location of a place, a name of a music album, a title of a song, or a name of an artist.

12. The system of claim 1, wherein the processor is configured to:
receive a speech input from an occupant of the vehicle; and
provide a response to the speech input based on correct recognition of the speech input using the database regardless of pronunciation associated with the speech input.

13. The system of claim 1, further comprising a memory configured to store the plurality of phonetic patterns when a network to communicate with the server is unavailable, wherein the transmitter is configured to transmit the plurality of phonetic patterns stored in the memory to the server when the network becomes available.

14. The system of claim 1, further comprising a version of the database in the vehicle, wherein when a network to communicate with the server is unavailable, the processor is configured to:
receive a speech input from an occupant of the vehicle;
correctly recognize the speech input using the version of the database in the vehicle regardless of pronunciation associated with the speech input; and
provide a response to the speech input based on the correctly recognized speech input.

15. The system of claim 14, wherein:
the speech input includes a voice command to call a person or a place of interest or a navigation command; and
the response includes execution of the voice command or the navigation command.

16. The system of claim 1, wherein the processor is configured to:
receive a speech input requesting information about a person or a location from an occupant of the vehicle; and
provide a response to the speech input based on correct recognition of the speech input using the database regardless of pronunciation associated with the speech input.

17. The system of claim 1, wherein the processor is configured to:
receive a voice command to call a person or a place of interest from an occupant of the vehicle; and
execute the voice command based on correct recognition of the voice command using the database regardless of pronunciation associated with the voice command.

18. The system of claim 1, wherein the processor is further configured to process speech input of an occupant of the vehicle and to control the vehicle based on the speech input of the occupant of the vehicle.

19. The system of claim 1, wherein the processor is configured to:
- receive an input including a voice command to control an operation of the vehicle; and
- control the operation of the vehicle based on correct recognition of the input using the database regardless of pronunciation associated with the input.

20. The system of claim 19, wherein the operation of the vehicle includes driving the vehicle to a location; controlling speed of the vehicle; or controlling an electrical, electronic, mechanical, or electromechanical system of the vehicle.

* * * * *